United States Patent [19]

Liu

[11] Patent Number: 5,224,961
[45] Date of Patent: Jul. 6, 1993

[54] BABY CARRIAGE WHEEL MOUNTING DEVICE

[76] Inventor: Kun-Hei Liu, 2F., No. 32, Lane 200, Tung Hwa Street, Taipei, Taiwan

[21] Appl. No.: 890,123

[22] Filed: May 29, 1992

[51] Int. Cl.⁵ .............................. B60B 35/00
[52] U.S. Cl. ........................... 301/111; 301/121
[58] Field of Search ............... 301/111, 112, 114, 115, 301/119, 120, 121, 122, 125, 131, 124.1

[56] References Cited

U.S. PATENT DOCUMENTS

| | | | |
|---|---|---|---|
| 2,717,807 | 9/1955 | Kapp | 301/114 X |
| 3,740,100 | 6/1973 | Perego | 301/121 |
| 3,813,054 | 5/1974 | Klingspor | 301/112 X |
| 4,963,115 | 10/1990 | Davin et al. | 301/111 X |

FOREIGN PATENT DOCUMENTS

| | | | |
|---|---|---|---|
| 1505849 | 4/1969 | Fed. Rep. of Germany | 301/111 |
| 0264404 | 2/1989 | German Democratic Rep. | 301/111 |

*Primary Examiner*—Russell D. Stormer
*Attorney, Agent, or Firm*—Varndell Legal Group

[57] ABSTRACT

A baby carriage wheel mounting device comprising a wheel holder having a hollow wheel axle directly molded thereon to hold a wheel at one end by a wheel cap. The hollow wheel axle comprises a square rod on its inside and two opposite retaining slots on the peripheral wall thereof; the wheel cap comprises a hollow plug rod inserted through a hole on the wheel into the hollow wheel axle with two opposite projecting blocks respectively engaged into the two retaining slots on the wheel axle permitting the square rod of the wheel axle to be received in a square hole thereon.

2 Claims, 2 Drawing Sheets

BABY CARRIAGE WHEEL MOUNTING DEVICE

BACKGROUND AND SUMMARY OF THE INVENTION

The present invention relates to a wheel mounting device for mounting a wheel or wheels on a baby carriage conveniently.

In a baby carriage, each wheel is mounted on a respective wheel axle, which is fastened in a hole on a respective wheel holder, and secured in place by a locknut. Washers are provided on each wheel axle to ensure tightness. When assemblied, each locknut must be properly tightened so that the wheels are stably respectively maintained in place without being stuck. While tightening or loosening a locknut, a suitable hand tool must be used. Because this wheel mounting procedure is difficult to achieve, the wheels of a baby carriage are fixed at factory before the delivery. In consequence, a consumer has no choice to buy a baby carriage with optional wheels whether the wheels of a baby carriage are of the desired size or not. Because the wheels of a baby carriage are not separately packed, much storage space is required for shipping a lot of baby carriages.

The present invention has been accomplished to eliminate the aforesaid problems. It is therefore an object of the present invention to provide a baby carriage wheel mounting device which makes the mounting of a wheel on a baby carriage easy. It is another object of the present invention to provide a baby carriage wheel mounting device which permits a wheel to be conveniently fastened to a baby carriage without the use of any tools.

To achieve the aforesaid objects, there is provided a baby carriage wheel mounting device which is generally comprised of a wheel axle, which is directly molded on a wheel holder, and a wheel cap, which is fastened to the wheel axle at one end to secure a wheel thereon. The cap comprises a hollow plug rod inserted through a hole on the wheel into a hole on the wheel axle with two opposite projecting blocks thereof respectively engaged into two retaining slots on the wheel axle for quick connection. The wheel axle has a square rod, which is inserted into a square hole on the plug rod of the cap when the cap has been fastened into position. By means of the guidance of the square rod, the cap can be conveniently fastened into position.

DETAILED DESCRIPTION OF THE PREFERRED EMBODIMENT

Figure 1:
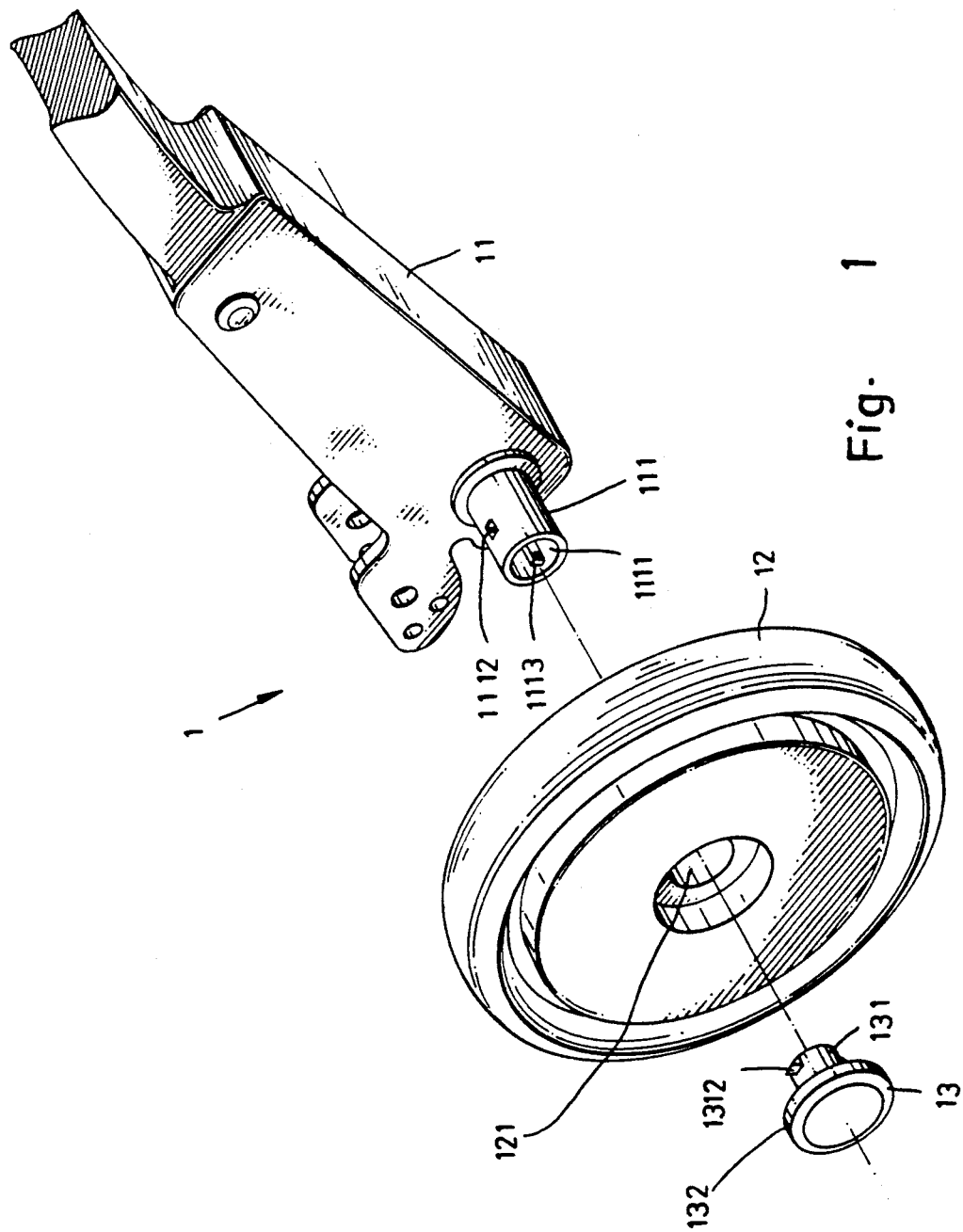
FIG. 1 is an exploded view of the preferred embodiment of the baby carriage wheel mounting device of the present invention.
Figure 2:
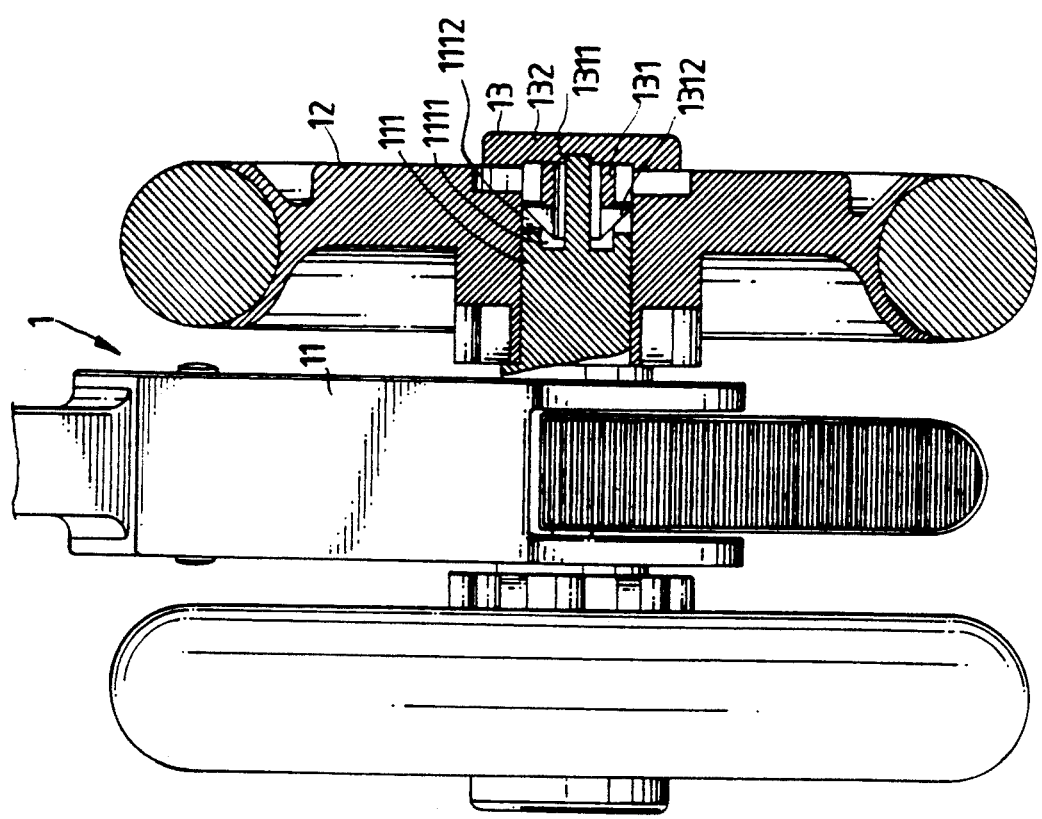
FIG. 2 is a cross section showing that a wheel has been mounted on the wheel axle and secured in place by the wheel cap.

Referring to FIGS. 1 and 2, a baby carriage wheel mounting device 1 is generally comprised of a wheel holder 11 having a wheel axle 111 directly molded thereon to hold a wheel or wheels 12 by a wheel cap or wheel caps 13. The wheel holder 11 is made from a rigid plastic material through the process of injection with the wheel axle 111 directly formed thereon. In the present preferred embodiment, the wheel axle 111 has two opposite ends extended from two opposite faces of the wheel holder 11 for mounting two wheels 12 respectively.

Referring to FIGS. 1 and 2 again, the wheel axle 111 has a square rod 1113 in a circular hole 1111 aligned with the central axis thereof, and two retaining slots 1112 on the peripheral wall thereof at two opposite locations and disposed in communication with the circular hole 1111. The wheel cap 13 comprises a hollow plug rod 131 longitudinally extended from an expanded head 132. The hollow plug rod 131 of the wheel cap 13 comprises two opposite resilient projecting blocks 1312 respectively formed on the peripheral wall thereof in a substantially triangular shape, and a square hole 1311 on the front end aligned with the central axis thereof. By inserting the plug rod 131 through a hole 121 on a wheel 12 into the circular hole 1111 on the wheel axle 111 and permitting the square rod 1113 and the projecting blocks 1312 to be respectively engaged into the square hole 1311 and the retaining slots 1112, the wheel 12 is revolvably secured to the wheel holder 11.

In the aforesaid arrangement, the square rod 1113 has a front end extending out of the front end of the peripheral wall of the wheel axle 111, and therefore, the plug rod 131 of the wheel cap 13 can be conveniently guided into position.

I claim:

1. A baby carriage wheel mounting device comprising a wheel holder having a wheel axle directly molded thereon, a wheel having a hole slid over said wheel axle, and a wheel cap secured to an end of said wheel axle and holding said wheel on said wheel axle; said end of said wheel axle having a peripheral wall formed by a circular hole longitudinally aligned with a central axis of said wheel axle, a square rod longitudinally aligned with said central axis of said wheel axle, and two retaining slots oppositely arranged in said peripheral wall and communicating with said circular hole; said wheel cap having an expanded head with a square hole receiving an end of said square rod, a hollow plug rod longitudinally extending from said expanded head and inserted into said circular hole of said wheel axle, said hollow plug rod having two oppositely arranged resilient projecting blocks respectively received in said two retaining slots of said wheel axle.

2. The baby carriage wheel mounting device according to claim 1, wherein said square rod extends out of said wheel axle for fastening said wheel cap in position.

* * * * *